(12) United States Patent
Moore et al.

(10) Patent No.: US 7,221,748 B1
(45) Date of Patent: May 22, 2007

(54) METHOD FOR LINKING CALL LOG INFORMATION TO ADDRESS BOOK ENTRIES AND REPLYING USING MEDIUM OF CHOICE

(75) Inventors: Darryl Cynthia Moore, Conyers, GA (US); Arnold Chester McQuaide, Jr., Berkeley Lake, GA (US); Xiaofeng David Gao, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 567 days.

(21) Appl. No.: 10/291,845

(22) Filed: Nov. 12, 2002

(51) Int. Cl.
*H04M 15/06* (2006.01)
(52) U.S. Cl. .................. 379/142; 379/88.21; 379/127; 707/3; 707/104.1
(58) Field of Classification Search ................ 379/196, 379/142, 88.21, 127; 707/3, 104.1
See application file for complete search history.

(56) References Cited

U.S. PATENT DOCUMENTS

| | | | |
|---|---|---|---|
| 6,282,275 B1 * | 8/2001 | Gurbani et al. ........ | 379/142.06 |
| 6,353,611 B1 | 3/2002 | Norris et al. ............... | 370/356 |
| 6,442,263 B1 * | 8/2002 | Beaton et al. ......... | 379/142.04 |
| 2005/0117729 A1 * | 6/2005 | Reing et al. ................ | 379/196 |

* cited by examiner

Primary Examiner—Charles Rones
Assistant Examiner—Belix M. Ortiz
(74) Attorney, Agent, or Firm—Merchant & Gould

(57) ABSTRACT

A method for utilizing the caller identification information stored in call logs to retrieve address book entries stored in a database, enabling a reply to each call in the call log using the communication medium and contact address of choice. Using this method, a customer can access the call logs for various phone numbers using a computer and can link to additional contact information associated with each entry. This additional contact information is stored in an address book database, either locally or on a network. Caller identification information in the call log can be used to search the address book and retrieve alternate addresses spanning a range of possible reply media, such as cell phones, E-mail, PDA, and telefacsimile.

20 Claims, 5 Drawing Sheets

METHOD FOR LINKING CALL LOG INFORMATION TO ADDRESS BOOK ENTRIES AND REPLYING USING MEDIUM OF CHOICE

FIELD OF THE INVENTION

The present invention relates to telephone call logs and, in particular, to methods for linking the call logs to address book entries for reply options.

BACKGROUND

Modern phone networks provide for the identification and logging of phone calls made across the network. The information available about these phone calls includes the date and time of the call, the duration of the call, the dialed number and the number placing the call, and the names and addresses of the persons or businesses associated with these numbers. This information can be logged in a personal computer, a private branch exchange (PBX), Centrex equipment, or a database connected to a network such as a service provider network or a TCP/IP type computer network. Most of this information is typically not made available to the general public but is used for the purposes of Call Detail Reporting, to monitor phone usage, and to provide for customer billing.

Some of such information, for example the number originating the phone call, can be displayed at the dialed number on the Customer Premises Equipment (CPE). The CPE displays the number placing the call and logs a record of that number locally along with the date and time of that call. Some services may also display the name of the subscriber assigned to the originating number. Personal computers connected to services such as Asynchronous Digital Subscriber Lines (ASDL) can also create logs of received calls that are resident locally in these computers or logged in the network. In either example, however, a person must be at the CPE or personal computer to view these received call logs and typically manually re-enters the originating numbers to return missed calls or to save the contents of the call log.

Modern telephone services utilizing Internet Protocol (IP) phone service, such as is available with ASDL, provide added functionality over conventional wire line type phones. In particular, IP phones can alert a subscriber to an incoming or waiting call using "pop-up" style on-screen windows. The user can then choose whether or not to answer the call. In addition, such services provide for the logging of phone calls into a call log associated with an IP phone number. The subscriber can then access and review the call log. Examples of such services can be found in U.S. Pat. Nos. 6,282,275 and 6,353,611. The use of the information contained in these call logs, however, has been quite limited. Moreover, the call logs are stand alone applications and are not integrated with other computer based programs located at a subscriber's premises.

Therefore, a method is desired to provide increased utilization and functionality of a telephone call log. Such increased utilization would include integration with other computer based communication and address book programs for storage and retrieval of call log information, and use of that information to contact call log entries.

SUMMARY OF THE INVENTION

An embodiment of a method according to the present invention links the call log contents of a call to address book entries stored either locally on a customer's personal computer or on a network, to provide option in replying to that call. The method includes retrieving the call log associated with the called phone number from a first database, selecting at least one entry from the list of callers in the call log, retrieving at least one address book for the selected entry from a second database, the address book comprising a plurality of contact addresses for the selected entry, selecting one or more contact addresses, and contacting the selected entry using the selected contact addresses via a medium of choice (e.g., E-mail, I-page, or alternate phone numbers).

In order to retrieve the address book, a customer interfaces with a call log manager that launches at least one computer executable address program having access to the address books stored in the second database, searches the second database for address books associated with the selected entry, retrieves at least one address book associated with the selected dialing number entry, and displays the contents of the retrieved address books. The contact addresses include E-mail addresses, internet pager addresses, wire line phone numbers, internet protocol phone numbers, telefacsimile numbers, instant messaging addresses, personal digital assistant addresses, or combinations thereof.

After the customer selects one or more contact addresses, the call log manager launches at least one computer executable communication program capable of utilizing the selected contact addresses. The customer then uses this communication program to contact the parties associated with the selected entries from the call log.

The method of the present invention provides the advantage of providing a customer with increased utilization of the contents of a call log to manage missed phone calls. In addition, management and use of the call log is provided in a single automated environment that provides for contacting parties using any one of a number of communications media, saving the customer time in have to look up addresses for the entries in a call log and launching separate programs to communicate with these entries.

DETAILED DESCRIPTION

A method according to the present invention uses call log information to retrieve a caller profile and to reply using the medium and address of choice. This method can be used to retrieve and utilize the contents of call logs stored in databases that are located both internally and externally to telephone networks or Service Provider Networks (SPN) including wireless networks and wireline networks such as Publicly Switched Telephone Networks (PSTN). Preferably, the call logs are stored in databases located at the premises of subscribers or customers of the SPN.

Figure 1:
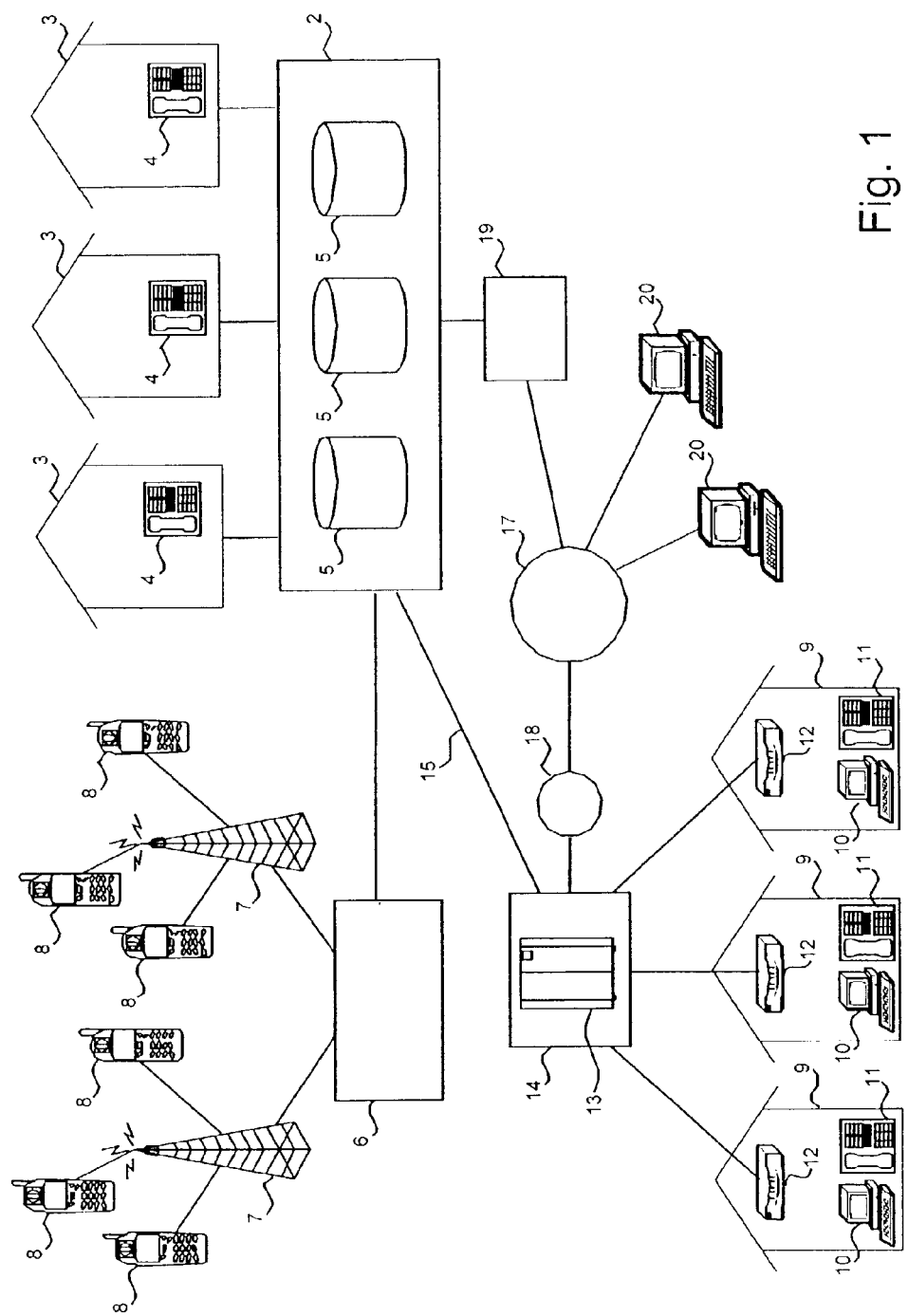
FIG. 1 is a schematic of one embodiment of a subscriber and service provider network configuration for use with a method of the present invention.

Referring initially to FIG. 1, an example of a network configuration 1 for use with an embodiment of the present invention is illustrated. The SPN 2, for example a PSTN, is provided and may include a plurality of wireline subscribers 3. Each wireline subscriber 3 includes Customer Premises Equipment (CPE) 4 such as telephones, answering machines, telefacsimile machines, and caller identification displays. The SPN 2 also includes at least one, and preferably a plurality of, internal databases 5 for storing information necessary for the operation of the SPN 2. Suitable information includes profile information about subscribers including billing information, communication protocols, information about services to which various subscribers have subscribed and call logs.

The SPN 2 is connected to one or more wireless communication networks 6. Each wireless communication network includes transmission equipment 7, such as cellular towers, for communicating with a plurality of wireless devices 8 such as, for example, cellular phones, pagers and personal digital assistants (PDA). The wireless devices are in communication with the SPN 2.

The SPN 2 also includes a plurality of Digital Subscriber Line (DSL) customers 9, for example Asymmetrical Digital Subscriber Line (ASDL) customers. These subscribers have CPE that includes, for example, personal computers 10 and telephones for use as conventional phones or as IP-type phones. The DSL subscribers CPE interface with the SPN through a plurality of routers 12 or DSL line modems disposed at the subscribers' premises. The routers are connected to one or more Digital Subscriber Line Access Multiplexers (DSLAM) 13 disposed, for example, at a central office 14. Each DSL subscriber can also include one or more subscriber databases 16 for logging information locally including call logs. In one embodiment, the subscriber databases 16 are disposed in the CPE personal computers 10.

The DSLAMs can be in direct communication with the SPN through a directed communication link 15. Alternatively, the DSLAMs are connected to a computer network 17, such as a wide area network including the internet or world wide web, through an Internet Service Provider (ISP) 18. The computer network is in communication with the SPN through a web portal 19. The computer network may also include a plurality of additional computers 20 directly connected to the network itself, and one or more databases (not shown) for storing information including call logs. This network configuration permits communication and data transfer among the numerous devices, networks, and subscribers using various types of equipment, methods, and protocols readily available and known in the art.

Figure 2:
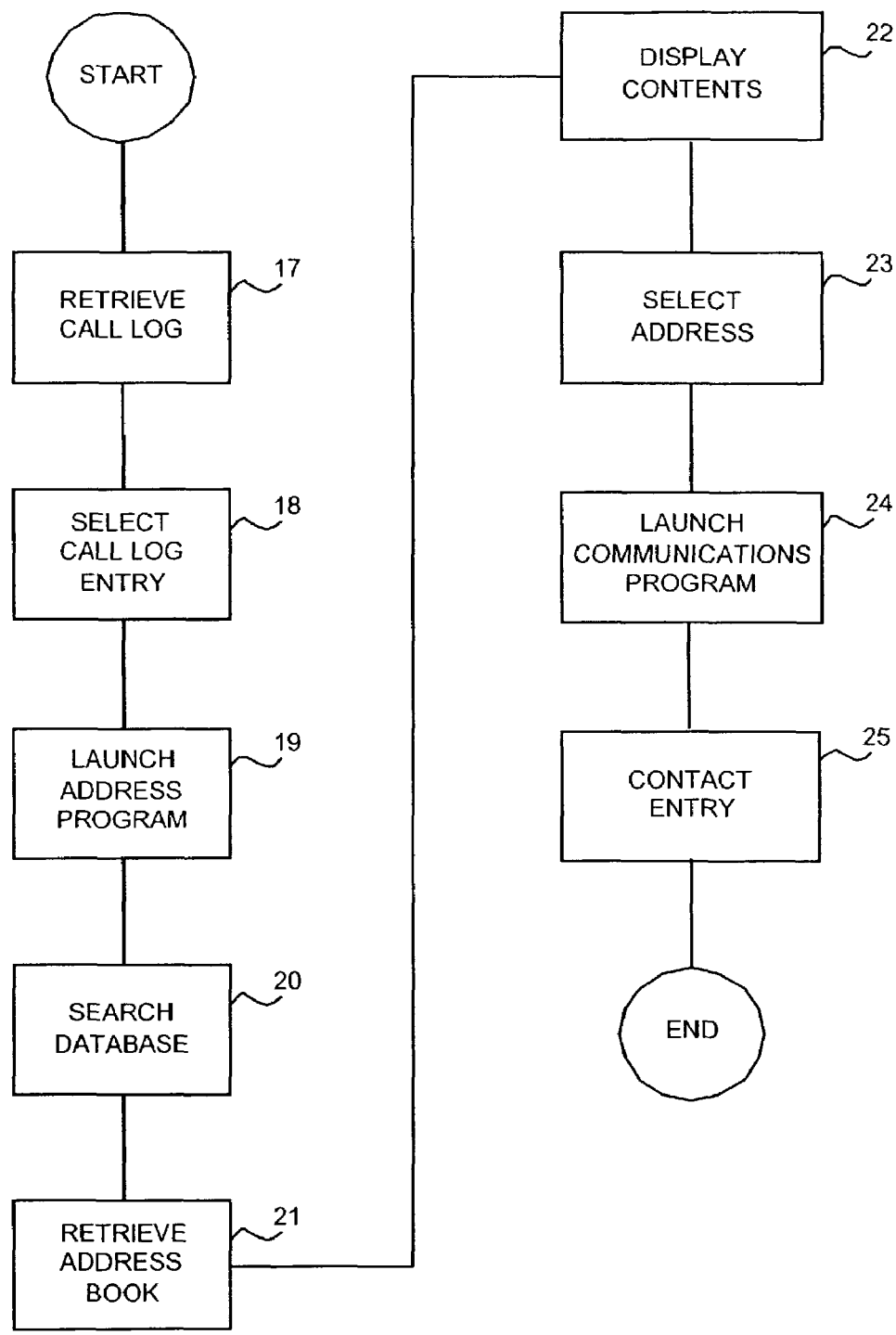
FIG. 2 is a high level flow chart illustrating an embodiment of a method of the present invention.

Referring to FIG. 2, in an embodiment of a method of the present invention, a customer or subscriber wishing to retrieve, view and utilize the contents of a call log for one or more subscriber phone numbers on the SPN, including wireline subscribers, DSL/IP subscribers, and wireless subscribers, retrieves the call log associated with the phone 17. The call logs are retrieved from a first database. Suitable first databases are located internal to the SPN and at the premises of the customer associated with the phone numbers for which the call logs have been retrieved.

The customer interfaces with the SPN or the first database using the customer's CPE, including both wire line subscriber CPE and DSL subscriber CPE, through a wireless device in the wireless network, or through a computer connected to the computer network. Suitable methods to access the SPN include E-mail, internet website interfaces using, for example, windows-type environments, and dedicated call-up servers. In one embodiment, the customer retrieves the call log using a computer. In another embodiment, the computer is a customer premises computer 10 in communication with the first database. Preferably, the first database 16 and the customer premises computer 10 are located at the premises of the customers associated with the phone numbers for which the call logs have been retrieved. In one embodiment, the first database is disposed within the customer premises computer.

In one embodiment, retrieval of a call log is facilitated by a call log manager program that runs on the computer that the customer uses to retrieve the call log. The call log manager can access the first database, read, and display the contents of the call log on the customer's computer screen.

Once the customer has retrieved at least one call log, the subscriber can view the contents of the call log. The call log can be formatted and arranged using any suitable method for providing lists of database information that are available and known in the art. Preferably, the call log is formatted as a list of entries arranged in chronological order and containing information about the calls placed to the phone number for which the call log was retrieved. This information includes the date and time of each call, the phone number placing the call, and the status of the call, for example "Left Message", "Hung Up" or "Answered". The customer scrolls the list and selects entries from the list using conventional methods for scrolling list and selecting entries 18. Preferably, each entry is provided as a hyperlink, and the entries are selected by pointing to the desired entry using a computer pointing device such as a mouse and "clicking" on that entry. Multiple entries can be selected from the list using methods known in the art such as depressing and holding the CTRL key while "clicking" multiple entries. Again, the call log manager facilitates these functions.

Once the desired entries are selected, at least one address book is retrieved for each selected entry from a second database. Suitable second databases are located internal to the SPN and at the premise of the customer associated with the phone number for which the call log has been retrieved. Preferably, the second database is located at the premises of the customer. In one embodiment, the second database is disposed within the customer premises computer. Preferably, the first and second databases are the same database.

In order to retrieve the address books for the selected entries, at least one computer executable address program is launched automatically by the call log manager 19 upon selection of the entries by the customer The address programs have access to the second database and are capable of reading the various formats in which the address books are stored. Suitable formats for the address books include, but are not limited to, OUTLOOK® commercially available from the Microsoft Corporation, Hotmail® commercially available from the Microsoft Corporation, Eudora commercially available from Software Oasis, Inc., bigfoot™ commercially available from Bigfoot Communications, InfoSpace™ commercially available from InfoSpace, Inc., and BellSouth.net™ commercially available from BellSouth Incorporated. The address books were previously stored in the second database by the associated native programs.

The address program then searches all of the address book formats on the second database for address books related to the selected entries 20. In order to facilitate this searching, the call log manager extracts identification information from the selected entries such as phone numbers. The address program then searches all address books for the extracted phone numbers. Once the address books have been located, the call log manager retrieves at least one address book associated with each selected entry 21 and displays the contents of the retrieved address books to the requesting customer 22, preferably on the screen of the customer premises computer. In one embodiment, the call log manager displays the retrieved address books in the format of the application associated with that address book. In another embodiment, the call log manager extracts information from the various address books and creates and displays a single address book containing the accumulated information. The call log manager also facilitates moving among the various address books. In one embodiment, the call log manager provides for the synchronization of information among the various address books associated with a single call log to the extent that each address book supports a specific type of information.

Each displayed address book contains a plurality of contact addresses for the selected entry to which it is associated. Each contact address represents a different format or method for contacting the party that contacted or attempted to contact the phone number for which the call log was requested. Suitable contact addresses include E-mail addresses, internet pager addresses, wire line phone numbers, wire less phone numbers, internet protocol phone numbers, telefacsimile numbers, instant messaging addresses, personal digital assistant addresses, and combinations thereof. The contact addresses are displayed by the same methods and formats as the call logs, and the customer can view and select entries from the contact address list using the same methods as for the call log.

The customer then selects one or more contact addresses from the displayed list of contents of the address books 23. The customer selects the contact addresses based upon the method by which that customer wishes to contact the party that called. For example, the party may wish to immediately contact the party that called by dialing the party's cellular phone. Alternatively, the customer may send a fax or contact the party that called via E-mail. Once the contact addresses are selected, then the call log manager launches at least one computer executable communications program capable of utilizing the selected contact address to contact the party that called 24. In one embodiment, the call log manager launches independent existing programs associated with the contact addresses. In another embodiment, the call log manager launches an independent proprietary program capable of utilizing the contact address including using E-mail and internet protocol phones, both software and handset types. In order to facilitate use of the contact address, the call log manager can interface with the internet or World Wide Web through an internet protocol network interface. The call log manager then prompts the customer for any additional information as needed and contacts the party associated with the selected contact address 25.

Figure 3:
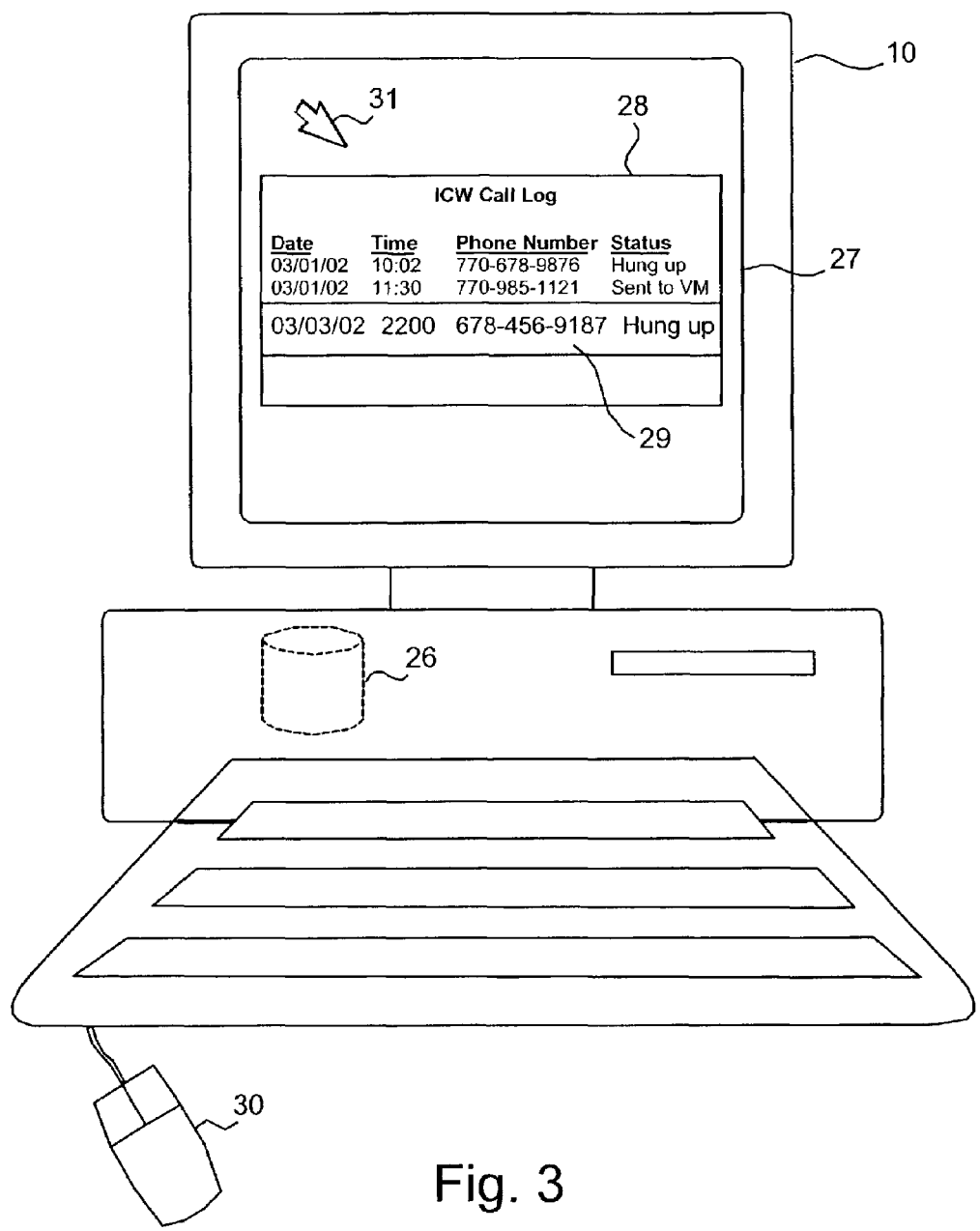
FIG. 3 is an illustration of a first computer interface for use with the method of the present invention.
Figure 4:
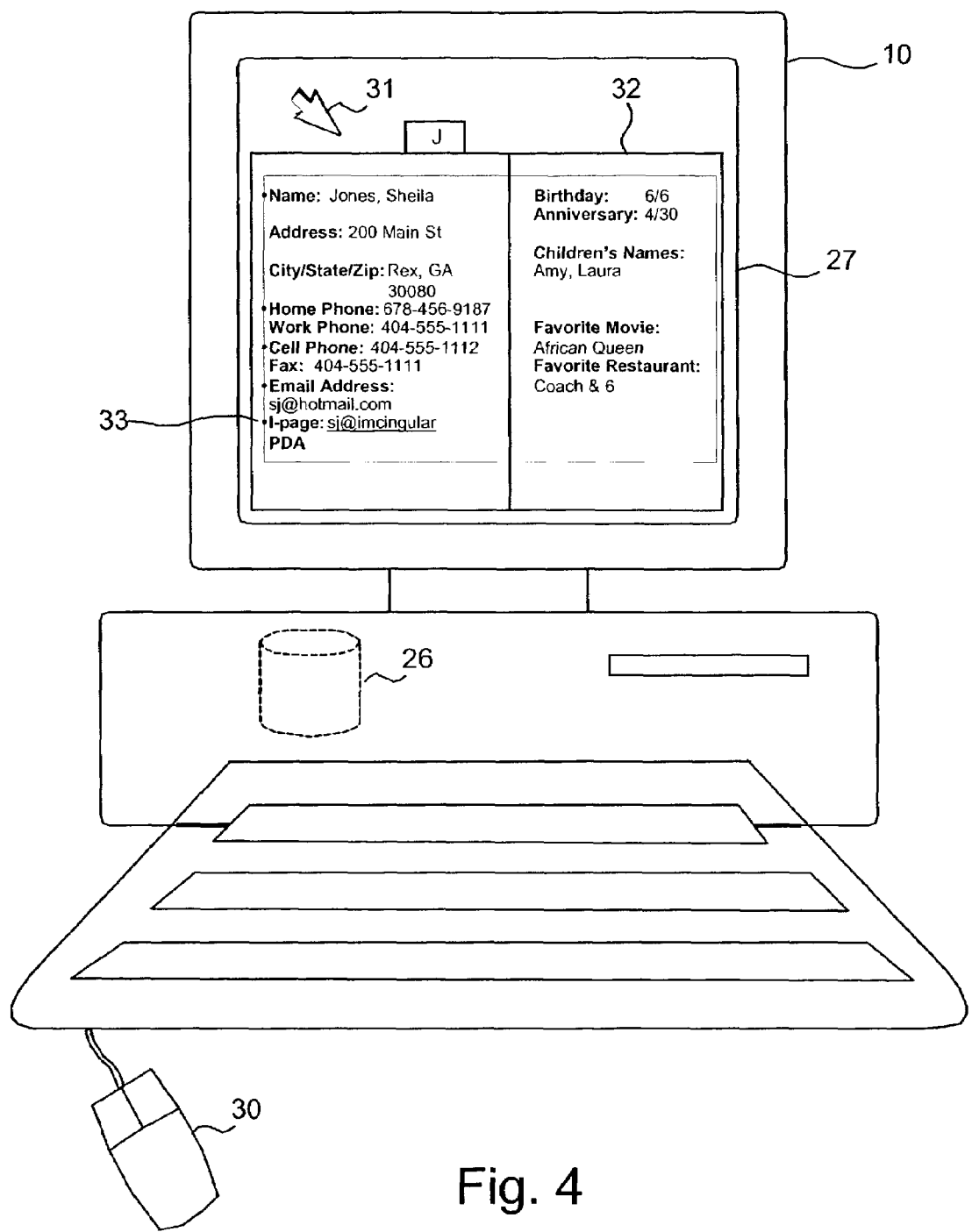
FIG. 4 is an illustration of a second computer interface for use with the method of the present invention.
Figure 5:
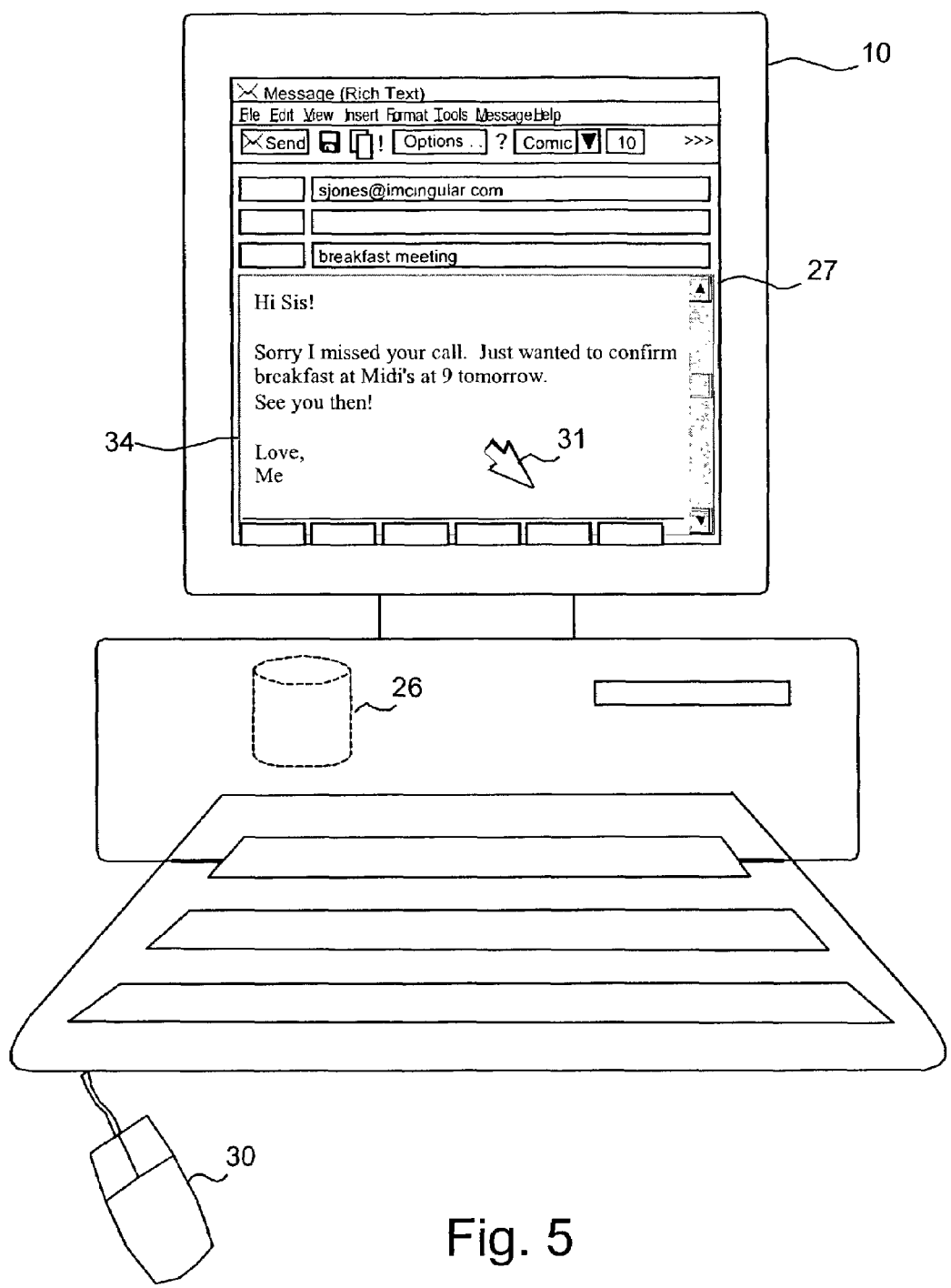
FIG. 5 is an illustration of a first computer interface for use with the method of the present invention.

As an example of the use of the method of the present invention as illustrated in FIGS. 3–5, a DSL customer or subscriber having CPE including a personal computer 10 containing an internal database 26 wishing to access the contents of a call log associated with the internet protocol telephone number for the premises containing the computer 10 and resident on the internal database 26 initiates the call log manager on the computer 10. As is shown in FIG. 3, the customer uses the call log manager to retrieve the call log for the internet protocol phone number which is displayed on the screen 27 of the computer 10 as a list in a Call Log box 28. The call log is associated with an Internet Call Waiting (ICW) service provided with the customers subscription to the internet protocol phone number. The customer views the call log and selects an entry 29 from the call log to contact using a pointing device 30 and cursor 31.

The call log manager extracts the phone number, NPA-NNN-NNNN, from the selected entry 29 and searches the second database for all address books containing or associated with that phone number. As is shown in FIG. 4, the call log manager then displays an address book display 32 on the screen 27. The address book display is arranged as an alphabetical page in an address book and contains all of the stored contact information and addresses for the party associated with the selected entry. The customer selects the PDA contact address using the cursor and pointing device. As is shown in FIG. 5, the call log manager launches an E-mail program and provides the customer with an E-mail window 34 addressed to the party associated with the address book. The customer then types in a message as desired and sends the E-mail using conventional methods.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A method for utilizing the contents of a call log containing a list of callers to a phone number the method comprising:
    retrieving the call log associated with the phone number from a first database;
    selecting at least one entry from the list of callers in the call log;
    indicating a status of the at least one entry selected from the call log wherein the status at least one chosen from a group consisting of: "Answered", "Hung Up" and "Left a Message" wherein the "Answered" status indicates a phone call was received by a party, the "Hung Up" status indicates the phone call was disconnected before the phone call was answered by the party, and the "Left a Message" status indicates a caller left a voice mail message;
    retrieving at least one address book for the selected entry from a second database, the address book comprising a plurality of contact addresses for the selected entry;
    selecting one or more contact addresses wherein the selected one or more contact addresses indicates a user selectable process for contacting the selected entry; and
    contacting the selected entry using the selected contact addresses.

2. The method of claim 1, wherein retrieving the address book comprises:
    launching at least one computer executable address program having access to the address books stored in the second database;
    searching the second database for address books associated with the selected entry;
    retrieving at least one address book associated with the selected entry; and
    displaying the contents of the retrieved address books.

3. The method of claim 2, wherein selecting one or more contact addresses comprises selecting one or more contact addresses from the displayed contents of the address books.

4. The method of claim 3, wherein contacting the selected entry comprises launching at least one computer executable communication program capable of utilizing the selected contact addresses.

5. The method of claim 1, wherein the contact addresses comprise E-mail addresses, internet pager addresses, wire line phone numbers, internet protocol phone numbers, telefacsimile numbers, instant messaging addresses, personal digital assistant addresses, or combinations thereof.

6. The method of claim 1, wherein the call log is associated with an internet protocol phone number.

7. The method of claim 6, wherein the first database is disposed at a customer premises associated with the internet protocol phone number.

8. A method for utilizing the contents of a call log containing a list of callers to a phone number, the method comprising:
   retrieving the call log associated with the phone number from a first database using a customer premises computer in communication with the first database, first database and the customer premises computer located at the premises of the customer associated with the phone number;
   selecting at least one entry from the list of callers in the call log, at least one entry selected from the call log wherein the status at least one chosen from a group consisting of: "Answered", "Hung Up" and "Left a Message" wherein the "Answered" status indicates a phone call was received by a party, the "Hung Up" status indicates the phone call was disconnected before the phone call was answered by the party, and the "Left a Message" status indicates a caller left a voice mail message;
   retrieving at least one address book for the selected entry from a second database, the address book comprising a plurality of contact addresses for the selected entry; and
   selecting one or more contact addresses wherein the selected one or more contact addresses indicates a user selectable process for contacting the selected entry; and
   launching at least one computer executable communication program capable of utilizing the selected contact addresses to contact the selected entry.

9. The method of claim 8, wherein the call log is associated with an internet protocol phone number.

10. The method of claim 8, wherein the contact addresses comprise E-mail addresses, internet pager addresses, wire line phone numbers, internet protocol phone numbers, telefacsimile numbers, instant messaging addresses, personal digital assistant addresses, or combinations thereof.

11. The method of claim 8, wherein retrieving the address book comprises:
   launching at least one computer executable address programs having access to the address books stored in the second database;
   searching the second database for address books associated with the selected entry;
   retrieving at least one address book associated with the selected entry; and
   displaying the contents of the retrieved address books.

12. The method of claim 11, wherein selecting one or more contact addresses comprises selecting one or more contact addresses from the displayed contents of the address books.

13. The method of claim 1, wherein selecting the one or more contact addresses wherein the selected one or more contact addresses indicates a user selectable process for contacting the selected entry comprises selecting the one or more contact addresses wherein the selected one or more contact addresses indicates a user selectable process for contacting the selected entry comprising one or more of the following: contacting the party by dialing the party's telephone; contacting the party by sending the party a facsimile; and contacting the party by sending the party an e-mail.

14. The method of claim 8, wherein selecting the one or more contact addresses wherein the selected one or more contact addresses indicates a user selectable process for contacting the selected entry comprises selecting the one or more contact addresses wherein the selected one or more contact addresses indicates a user selectable process for contacting the selected entry comprising one or more of the following: contacting a party by dialing the party's telephone; contacting the party by sending the party a facsimile; and contacting the party by sending the party an e-mail.

15. Method for replying to a communication comprising:
   receiving a communication;
      displaying a log containing an entry corresponding to the communication, the entry indicating a status wherein the status at least one chosen from a group consisting of: of one of the following: "Answered", "Hung Up" and "Left a Message" wherein the "Answered" status indicates a phone call was received by a party, the "Hung Up" status indicates the phone call was disconnected before the phone call was answered by the party, and the "Left a Message" status indicates a caller left a voice mail message;
      in response to receiving an input selecting the entry, retrieving at least one communication address associated with the entry;
      displaying a list comprising the at least one communication address;
      receiving a user input selecting the at least one communication address; and
      initiating a communication to the at least one communication address.

16. The method of claim 15, wherein the at least one communication address comprises a phone number.

17. The method of claim 15, wherein the at least one communication address comprises a cell phone number.

18. The method of claim 15, wherein the at least one communication address comprises an e-mail address.

19. The method of claim 15, wherein the at least one communication address comprises a facsimile number.

20. The method of claim 15, wherein the at least one communication address comprises an instant messaging address.

* * * * *